3,347,324
PROCESS OF MEASURING PILLS
Harry D. Stewart, 3507 Kesterwood Drive,
Knoxville, Tenn. 37918
Filed Oct. 21, 1965, Ser. No. 499,773
4 Claims. (Cl. 177—1)

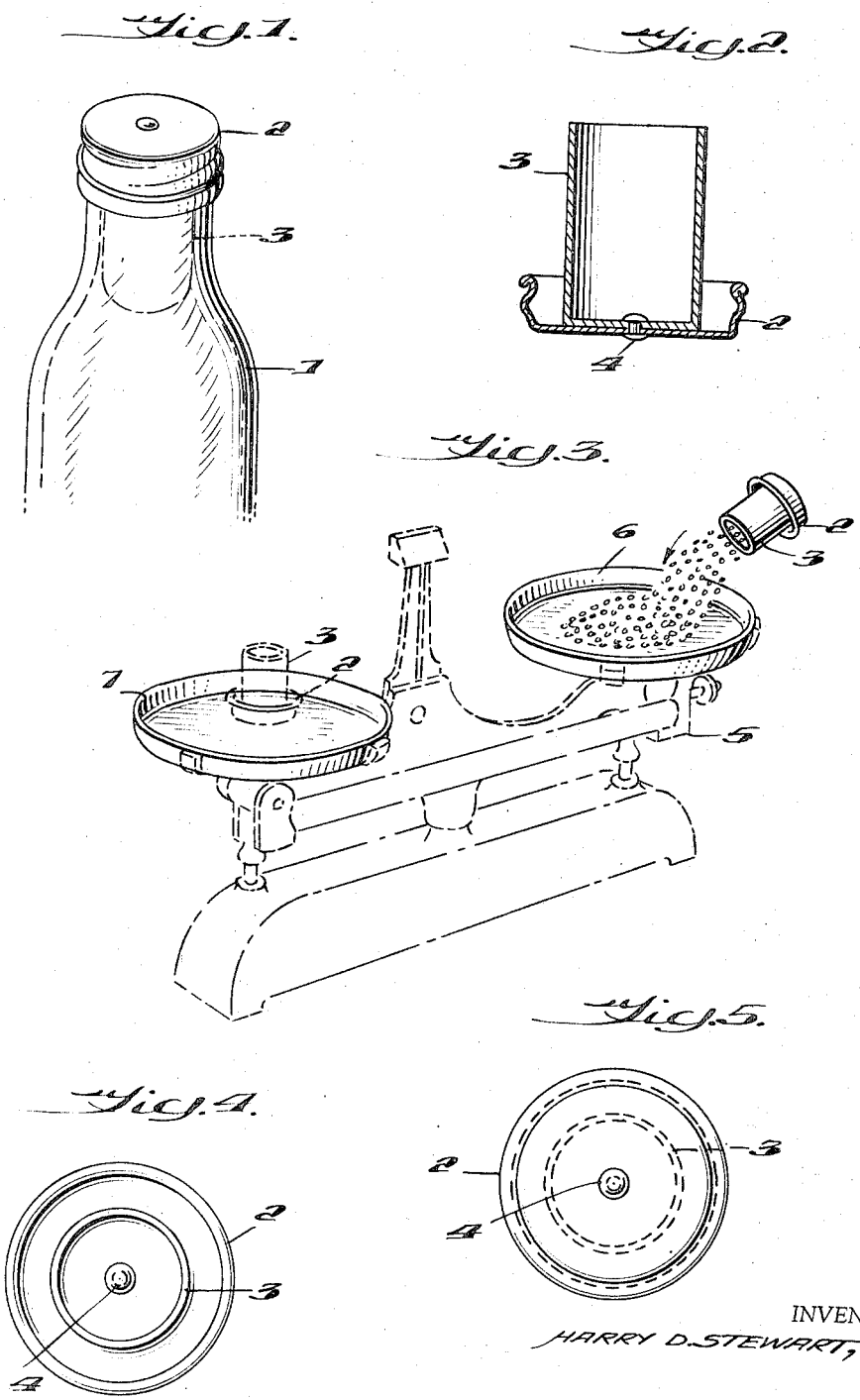

ABSTRACT OF THE DISCLOSURE

A process of determining a quantity of pills by weight involving measuring a predetermined quantity in a receptacle of known volume and using the receptacle as a balance to indicate whether the desired quantity was included in the initial measure.

This invention relates to a process of measuring pills and is applicable to many different forms of small masses of medicinal and chemical materials and the like.

Pills are usually sold to pharmacies in relatively large quantities. For example, there may be one thousand pills in a container, which the pharmacist dispenses in quantities specified by physicians such, for example, in lots of twenty-five or fifty. In order that the patient may have the prescribed dosage, it is important that the exact quantity be dispensed by the pharmacist, usually being placed in a small box or tube which is delivered to the user.

Pills, tablets and the like are manufactured accurately as to size, being molded or pressed to exact dimensions so that the size and weight thereof is uniform throughout the manufactured quantity delivered in a particular container. Where these must be counted one by one by the pharmacist, the dispensing of such pills is tedious and time-consuming. Nevertheless, there has been no other accurate method of dispensing predetermined quantities thereof.

One object of this invention is to simplify and improve the method of dispensing predetermined quantities of pills and other relatively small masses of medicinal preparations, chemicals and the like.

Another object of the invention is to utilize a measure for a predetermined quantity of pills in determining the weight thereof as, for example, on balance scales, and thereby dispensing accurately the desired number of pills as determined by weight.

These objects may be accomplished, according to this invention, by providing a measured receptacle in the supplier's container, which receptacle is graduated according to the number of pills to be dispensed to the patient as, for example, one hundred. The receptacle is used in measuring out the quantity of pills which are then poured onto the pan of balance scales. The weight of the receptacle is so proportioned to the composite weight of the dispensed quantity of pills as to balance exactly the weight thereof when the proper amount of pills is on the scales. Thus, the pharmacist utilizes the receptacle in pouring the measured quantity into one pan of the scales and then by setting the receptacle into the other pan thereof, he will have an indication by weight of the quantity dispensed, which will indicate whether or not the required number is present or whether some variation in the number is required.

This process is illustrated in the accompanying drawings, in which:

FIG. 1 is a perspective view of a container having a cap and receptacle used in dispensing pills and the like;

FIG. 2 is a vertical section through the cap and receptacle removed from the container;

FIG. 3 is a perspective view of balance scales and illustrating the measuring receptacle in connection therewith;

FIG. 4 is a bottom plan view of the measuring receptacle and cap; and

FIG. 5 is a top plan view thereof.

I have illustrated in FIG. 1 a conventional container, designated at 1, as used by a manufacturer of pills and the like for supplying his products to a pharmacist. Usually, such container 1 is of relatively large size and may contain a large quantity of the products as, for example one thousand or five thousand. Pills and tablets are made, however, in many different sizes and shapes and the size of the container will vary according to the particular products to be delivered or supplied therein.

The container 1 is provided with a cap 2 for closing the mouth thereof, usually having a screw threaded connection with the container so as to be removable for dispensing the contents therefrom. The cap 2 may be made of any suitable or desired material and is often made of sheet metal, plastic or other workable material and is so made as to be removably attached to the mouth of the container.

A receptacle is indicated at 3 in the form of a cup. While the receptacle 3 is shown as attached by a rivet 4 or other suitable fastening to the cap 2, it is also possible that the receptacle may be made in one integral piece with the cap. If made as a separate piece, the receptacle 3 may also be formed of sheet metal or of plastic or other suitable material, either the same as, or different from, the material of which the cap is formed.

The manufacturer's products vary considerably in size and density. The capacity of the receptacle 3 should equal the predetermined number of pills or the like to be dispensed, as for example one hundred. The manufacturer will select the size of the receptacle according to the number to be dispensed and according to the size of the individual pills. The weight of the receptacle, and of the receptacle and cap if they be combined as shown, should also equal the predetermined number of pills to be dispensed.

Where the pills are to be poured from a large container into a receptacle, the pharmacist requires a more accurate count of the prescribed number than depends upon the measured quantity alone. In the act of pouring the pills into the receptacle, the number for a predetermined volume may vary by reason of packing or looseness in the receptacle. Nevertheless, a measured quantity may be used as an approximate number, but the exact number can be determined by weight.

According to this invention, the pharmacist first pours out of the container 1 a quantity of pills to fill the receptacle 3. This represents the approximate number required for dispensing. A more exact count, however, is obtained by use of balance scales, indicated generally at 5 in FIG. 3, having pans 6 and 7. By pouring the measured quantity from the receptacle 3 into the pan 6, the pharmacist may obtain an indication as to whether the prescribed number of pills to be dispensed is thus obtained. This prescribed number is weighed by utilizing the receptacle 3 or the receptacle and cap, if combined, which is placed in the pan 7 to balance the predetermined number of pills in the pan 6. The pharmacist thus obtains an instant and ready indication as to whether the prescribed number is present. If too many are included to balance, some of these may be removed from the pan 6 or if an insufficient number are present, more pills may be added. This will be indicated by the balance scales. This avoids the necessity for counting out the dispensed quantity of pills and yet these are measured accurately since their weight is an accurate indication of the number.

The invention has been described in connection with pills. This term is used, however, in a generic sense and it will be understood that the process includes tablets and other small compressed masses of medicinal materials, chemicals and the like, as well as particulate materials which are to be dispensed in predetermined quantities determined by weight.

I claim:

1. A process of measuring pills by weight comprising measuring a quantity of the pills in a receptacle having a fixed weight of mass equal to a predetermined volume of pills substantially filling the receptacle, and balancing the receptacle with the volume of pills noting any imbalance in weight, and adding or subtracting any small number of pills to give an exact balance to achieve the desired predetermined volume.

2. A process of measuring pills according to claim 1, wherein the receptacle is connected with a cap for a container from which the pills are directed into the receptacle.

3. A process of measuring pills according to claim 1, wherein the receptacle forms a part of a cap for closing a pill container and from which the pills are poured into the receptacle, thereafter pouring the pills from the receptacle onto a dispensing balance, and balancing the quantity of pills thereon with the receptacle and cap as a weight noting any imbalance in weight, and adding or subtracting any small number of pills to give an exact balance to achieve the desired predetermined volume.

4. A process of dispensing pills from a container having a cap thereon with a receptacle carried by the cap and disposed within the container, said cap and receptacle having a fixed measured weight equal to the weight of a fixed predetermined quantity of pills, said process comprising the steps of pouring a predetermined quantity of pills from the container into the receptacle substantially filling the receptacle, pouring said pills from the receptacle onto a pan of a dispensing balance, and placing the cap and receptacle onto a second pan of the dispensing balance and noting any imbalance in weight, and adding or subtracting any small number of pills to give an exact balance to achieve the desired predetermined quantity of pills.

References Cited

UNITED STATES PATENTS

| 2,211,120 | 8/1940 | Holland | 141—322 |
| 2,957,503 | 10/1960 | Stifter | 141—322 |

OTHER REFERENCES

| 17,607 | 1890 | Great Britain. |
| 13,668 | 5/1893 | Great Britain. |

RICHARD B. WILKINSON, *Primary Examiner.*

GEORGE MILLER, *Assistant Examiner.*